No. 651,661.  
T. H. HART.  
VEHICLE.  
(Application filed Feb. 14, 1900.)  
Patented June 12, 1900.

(No Model.)  
3 Sheets—Sheet 1.

WITNESSES.
C. H. Gannett
J. Murphy

INVENTOR.
Thomas Henry Hart
by Jas. H. Churchill
atty.

No. 651,661. Patented June 12, 1900.
T. H. HART.
VEHICLE.
(Application filed Feb. 14, 1900.)

(No Model.) 3 Sheets—Sheet 2.

WITNESSES.
C. H. Gannett
J. Murphy.

INVENTOR.
Thomas Henry Hart
by Jas. H. Churchill
atty.

No. 651,661. Patented June 12, 1900.
T. H. HART.
VEHICLE.
(Application filed Feb. 14, 1900.)
(No Model.) 3 Sheets—Sheet 3.
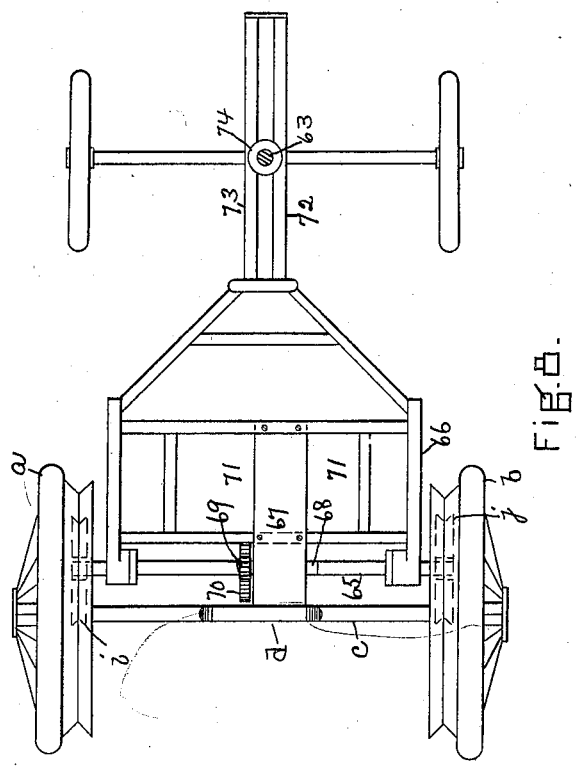
WITNESSES
C. H. Gannett
J. Murphy
INVENTOR
Thomas Henry Hart
by Jas. H. Churchill
atty.

United States Patent Office.

THOMAS HENRY HART, OF EVERETT, MASSACHUSETTS.

VEHICLE.

SPECIFICATION forming part of Letters Patent No. 651,661, dated June 12, 1900.

Application filed February 14, 1900. Serial No. 5,129. (No model.)

*To all whom it may concern:*

Be it known that I, THOMAS HENRY HART, a subject of the Queen of Great Britain, residing in Everett, in the county of Middlesex and State of Massachusetts, have invented an Improvement in Vehicles, of which the following description, in connection with the accompanying drawings, is a specification, like letters and numerals on the drawings representing like parts.

This invention relates to vehicles of that class employing driving-wheels which make contact with the inner circumference of larger road-wheels. The invention has for its object to provide a simple and efficient vehicle of the class referred to and one which has a maximum carrying capacity and can be easily started and rapidly propelled in either direction with a minimum power.

The invention is capable of being embodied in a vehicle propelled by foot-power or it may be embodied in a vehicle propelled by a motor.

In accordance with this invention I employ two frames movable forward and backward with relation to one another, one of said frames carrying the relatively large road-wheels and the other frame carrying the smaller driving-wheels, which engage the inner surface of annular flanges on the inner side of the road-wheels and which are free to move forward or backward from a vertical line through the axle of said road-wheels. These and other features of this invention will be pointed out in the claims at the end of this specification.

Figure 1:
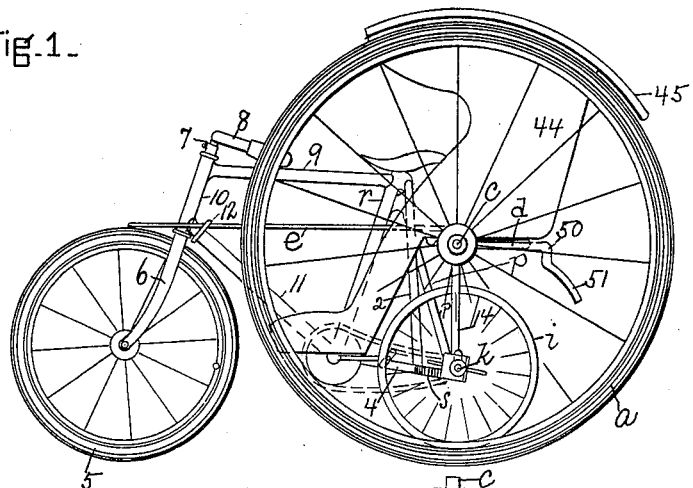
Figure 2:
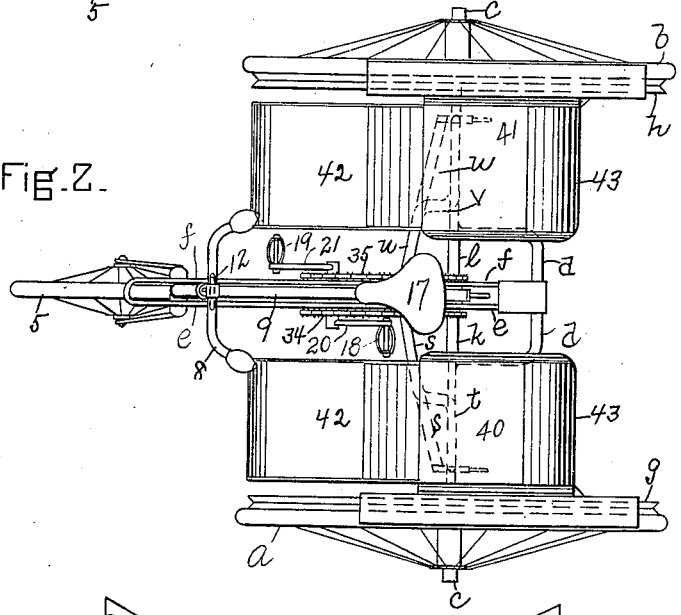
Figure 3:
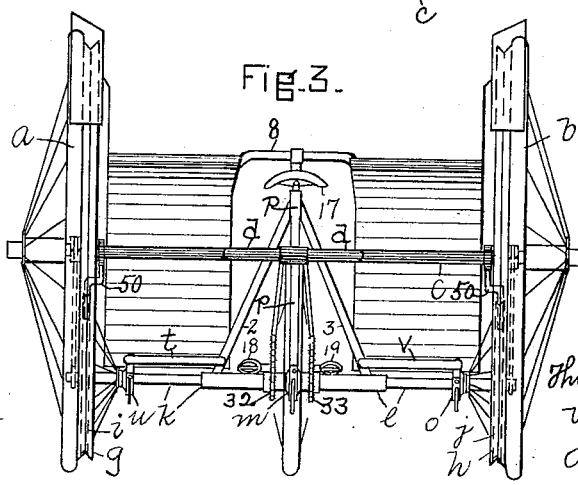
Figure 4:
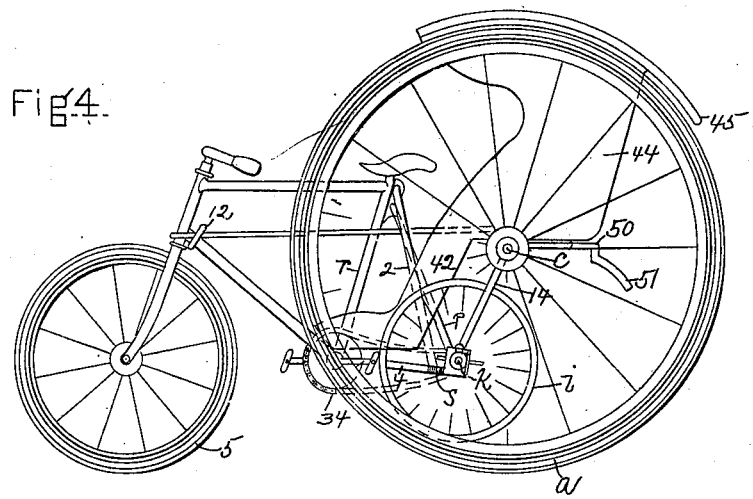
Figure 5:
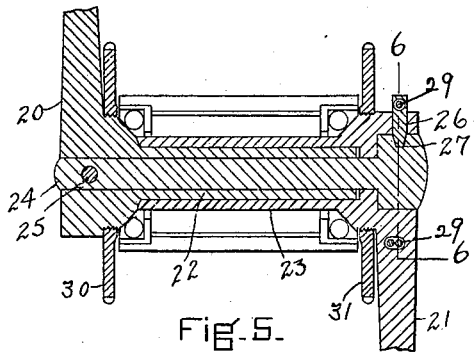
Figure 6:
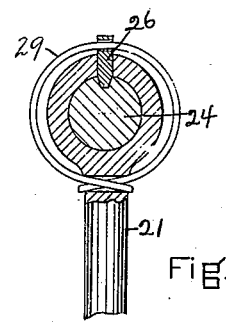
Figure 7:
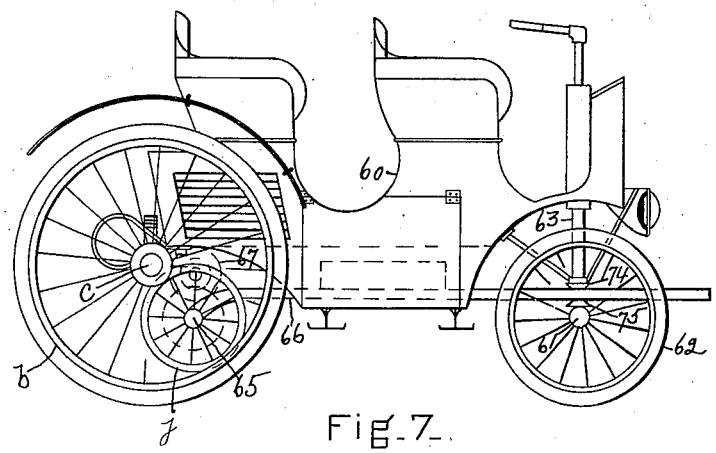

Figure 1 is a side elevation of a vehicle adapted to be propelled by foot-power and embodying this invention; Fig. 2, a plan view of the vehicle shown in Fig. 1; Fig. 3, a rear elevation of the machine shown in Fig. 1 looking toward the left; Fig. 4, a side elevation of the vehicle shown in Fig. 1 with the parts in the position they occupy when in motion in a forward direction; Figs. 5 and 6, details to be referred to; Fig. 7, a side elevation of a vehicle embodying this invention and driven by motor-power, and Fig. 8 a detail in plan to be referred to.

In Figs. 1 to 4 the invention is shown in a vehicle approximating in form a tricycle and in which two substantially-large road-wheels $a\,b$ are mounted to turn on an axle $c$, which is provided with a rearwardly-extended crank or offset portion $d$, to which is secured two substantially-horizontal and parallel bars $e\,f$, forming part of one frame for the vehicle. The road-wheels $a\,b$ are provided on their inner sides near the rim with annular flanges $g$ $h$, preferably V-shaped on their outer circumference, as herein shown.

The annular flanges $g\,h$ in accordance with this invention are engaged by correspondingly-shaped driving-wheels $i\,j$, fast on shafts or axles $k\,l$, which may be and preferably are independently rotated, the shaft $k$ being supported in bearings $m\,n$ and the shaft $l$ being supported in the bearings $m$ and in a bearing $o$. The bearings $m\,n\,o$ are secured to or supported by a second framework, which, as shown in Figs. 1 to 4, approximates that of the ordinary tricycle. In the present instance the bearing $m$ is secured to a rod or bar $p$, extended downward and rearwardly from the seat-post $r$ of the tricycle. The bearing $n$ is attached to two substantially-horizontal rods or bars $s\,t$, and the bearing $o$ is attached to two substantially-horizontal rods or bars $u\,v$. The rods $s\,u$ are connected to upright rods or bars 2 3, secured to the seat-post $r$, and are also secured to or form part of rods 4, extended rearwardly from the hanger of the tricycle, which latter is provided with the usual front wheel 5, carried by the forks 6 of the steering-post 7, provided with the handle-bar 8. The main portion of the tricycle-frame is similar to the frame of the ordinary bicycle and comprises the rods or bars 9, 10, and 11. The tricycle-frame is free to move independent of the frame carried by the road-wheels, but is yet connected therewith, which may be accomplished, as shown in Figs. 1 and 2, by extending the rods or bars $e\,f$ of the road-frame through a link 12, attached, as shown in Fig. 1, to the rod 11 of the tricycle-frame. The frame for the road-wheels is thus connected to the frame for the driving-wheels so that both frames will move as one in an upward direction, while free to be moved independent of each other in a horizontal direction. The link 12 forms one means for connecting the two frames at their front ends; but any other suitable means may be employed, and the said frames may and preferably will be connected at their rear ends, so as to move as one frame in an upward direction and yet be free to move in a horizontal direction independent of each other, and this latter connection may be accomplished by suitable links 14, loosely encircling the axle c and the axles k l. The links 14 prevent disengagement of the driving-wheels i j from the road-wheels.

The shafts k l of the driving-wheels may be driven by foot-power applied to the pedals 18 19 by a rider sitting on the seat 17. The pedals are carried by cranks 20 21, attached to a two-part crank-shaft comprising, as herein shown, (see Fig. 5,) a sleeve or hub 22, attached to the crank 20, and a sleeve or hub 23, attached to the crank 21 and fitted over the sleeve 22. The sleeves or hubs 22 23 are adapted to be connected together, as shown, by a stud or shaft 24, attached to the crank 20 by a pin 25 and detachably attached to the crank 21 by a spring-pressed pin 26, extended through the hub of the crank 21 into a socket 27 in an enlargement or head of the shaft 24, the pin 26 being normally held in the socket 27 by a spring 29. The crank-hubs 22 23 are operatively connected to the shafts k l, which may be effected by suitable gearing, shown as sprocket-wheels 30 31 on said hubs, sprocket-wheels 32 33 on the shafts k l, and link chains 34 35.

When the locking device or pin 26 is in engagement with its socket, the hubs or sleeves 22 23 are locked together and both shafts k l and their attached driving-wheels may be rotated in unison; but when said locking-pin is withdrawn from its socket 27 either shaft k l may be rotated independent of the other, which is desirable in turning the vehicle. The disengagement of the locking-pin 26 may be effected by holding one foot stationary and pedaling with the other.

The vehicle shown in Figs. 1 to 4 is designed to carry two persons as passengers besides the operator or driver, and for this purpose two seats 40 41 are suitably attached to or supported by the axle c of the road-wheels, said seats being located on opposite sides of the offset portion d of said axle, as shown in Fig. 2, so as to leave a clear space between them for the movement of the driving-frame in a backward direction when so desired. In the present instance the seats are shown as resting on the axle c, but in practice they will be spring-supported in any suitable manner. The seats 40 41 may and preferably will be provided with leg and foot rests 42, backs 43, and preferably also with sides 44, extended upward and preferably above the top of the road-wheels, where they are provided with outwardly-extended flanges 45, which project over the road-wheels and form mud-guards therefor. In the normal position of the vehicle—namely, at rest—the driving-wheels i j have their axles substantially in a vertical line with the axle of the road-wheels, as shown in Fig. 1, and when the driver works the pedals forward the driving-wheels move forward into substantially the position shown in Fig. 4, which is to one side of the central vertical line through the axle of the road-wheels, thus overcoming the load carried by the road-wheels and causing them to be rotated by the driving-wheels, which after the vehicle is in motion will gradually settle back toward the normal or starting position, depending upon the speed of driving-wheels and the grades and condition of the road. While the vehicle is in motion it can be easily turned by holding one foot stationary on its pedals and using the other foot to propel the vehicle, as above described.

If it is desired to hold back on the vehicle when descending a hill or if it is desired to back the vehicle on level ground, the driver by reversing the rotation of the driving-wheels will cause them to travel up the flanges on the opposite side of the normal position—that is, to the right, viewing Fig. 1. This backward movement of the driving-wheels and their supporting-frame is permitted in the construction shown in Figs. 1 to 4 by the rearwardly-extended crank or offset portion d of the axle c. The axle c may have secured to it suitable brake-beams 50, carrying brake shoes or blocks 51 of any suitable kind, which are located behind and in line with the driving-wheels i j, so that on descending steep hills the driving-wheels may engage said brake-shoes and retard the descent of the vehicle. It will thus be seen that the driving-wheels i j are free to be moved on the annular flanges of the driven or road wheels in either direction from the normal position and that the vehicle may be easily started by forcing the said wheels up on their coöperating flanges until sufficient leverage is obtained to overcome the load. The driving-wheels i j and the flanges on which they run may, if desired, be provided with rubber or other suitable material to prevent slipping and increase the frictional contact.

I have thus far described my invention as embodied in a vehicle driven by manual power; but I do not desire to limit my invention in this respect, as it is equally applicable to a vehicle driven by a motor, which vehicle may be provided with a single front wheel, after the manner shown in Fig. 1, or which may be provided with two front wheels, after the manner of the ordinary carriages.

In Figs. 7 and 8 I have shown one form of motor-propelled vehicle embodying this invention, in which the body 60 of the vehicle is spring-supported at its rear end by the axle c of the rear wheels, which are of the same construction as the wheels a b, (shown in Fig. 1,) and the front portion of the body 60 is suitably supported upon the axle 61 of the front wheels 62.

The front wheels 62 are turned by a steering-post 63, attached to or coöperating with the axle 61. The rear wheels a b are provided with the flanges g h and are rotated by the driving-wheels i j, fast on an axle 65, having bearings in a suitable framework 66, carrying a suitable motor, which may be an electric motor 67, which, as represented, has its armature-shaft 68 geared to the axle 65 by pinion 69 and gear 70 and which may derive its current from a storage battery 71, carried, as herein shown, by the frame 66.

The frame 66 is extended forward and is provided with two parallel rods 72 73, which straddle the steering-post 63 and are secured thereto against upward movement by two semispherical rings, wheels, or disks 74 75, between which the said rods are free to move horizontally and which also permit said rods to tilt or move in a vertical direction, as on a pivot, and thus allow the driving-wheels $i\,j$ to move up on the flanges $g\,h$ of the driven wheels in opposite directions from the normal or central position, with the axle of the driving-wheels in a vertical line with the axle of the rear road-wheels $a\,b$. The axle $c$ of the driven wheels $a\,b$ may be cranked or arched upward, as at $d$, (see Fig. 8,) so as to clear the motor 67.

I claim—

1. In a vehicle of the class described, the combination with substantially-large driven wheels mounted upon an axle, provided with annular flanges, of smaller driving-wheels engaging said flanges and free to travel up thereon in opposite directions from a normal position with the axle of the driving-wheels substantially in a vertical line with the axle of the driven wheels, substantially as and for the purpose specified.

2. In a vehicle of the class described, the combination with a framework provided with substantially-large driven wheels mounted on an axle, of a framework provided with smaller driving-wheels in frictional internal engagement with the driven wheels and free to travel up thereon in opposite directions from a normal position, and means to connect said frames together and yet permit longitudinal movement of the frame carrying the driving-wheels with relation to the frame carrying the driven wheels in opposite directions from a normal position with the axle of the driving-wheels substantially in a vertical line with the axle of the driven wheels, substantially as described.

3. In a vehicle of the class described, the combination with a framework provided with substantially-large driven wheels having annular flanges, and mounted on an axle of a second framework provided with independently-rotatable driving-wheels which engage the said annular flanges and are free to move up thereon in opposite directions from a normal position, substantially as and for the purpose specified.

4. In a vehicle of the class described, the combination with two substantially-large road-wheels provided with internal annular flanges, and mounted to turn on an axle having a cranked or offset portion intermediate of said wheels, of smaller driving-wheels engaging the flanges of said road-wheels and free to move up thereon in opposite directions from a normal position, substantially as described.

5. In a vehicle of the class described, the combination with two substantially-large road-wheels having internal annular flanges and mounted to turn on an axle having a rearwardly cranked or offset portion intermediate of said road-wheels, and seats supported by said axle on opposite sides of the longitudinal center thereof, of smaller driving-wheels engaging the flanges of said road-wheels and free to move up on said flanges in opposite directions from a normal central position, and a framework carrying the smaller driving-wheels, substantially as described.

6. In a vehicle of the class described, the combination with a substantially-large driven wheel having an annular flange, of a smaller driving-wheel engaging said flange and free to move up thereon in opposite directions from a normal position with the axle of the driving-wheel substantially in a vertical line with the axle of the driven wheel, substantially as described.

7. In a vehicle of the class described, the combination with a substantially-large driven wheel having an annular flange, and mounted on an axle, of a smaller driving-wheel engaging said flange and free to move up thereon in opposite directions from a normal position with the axle of the driving-wheel substantially in a vertical line with the axle of the driven wheel, and a link loosely connecting said axles to maintain the driving-wheel in engagement with said flange.

In testimony whereof I have signed my name to this specification in the presence of two subscribing witnesses.

THOMAS HENRY HART.

Witnesses:
JAS. H. CHURCHILL,
J. MURPHY.